United States Patent Office 2,738,410
Patented Mar. 13, 1956

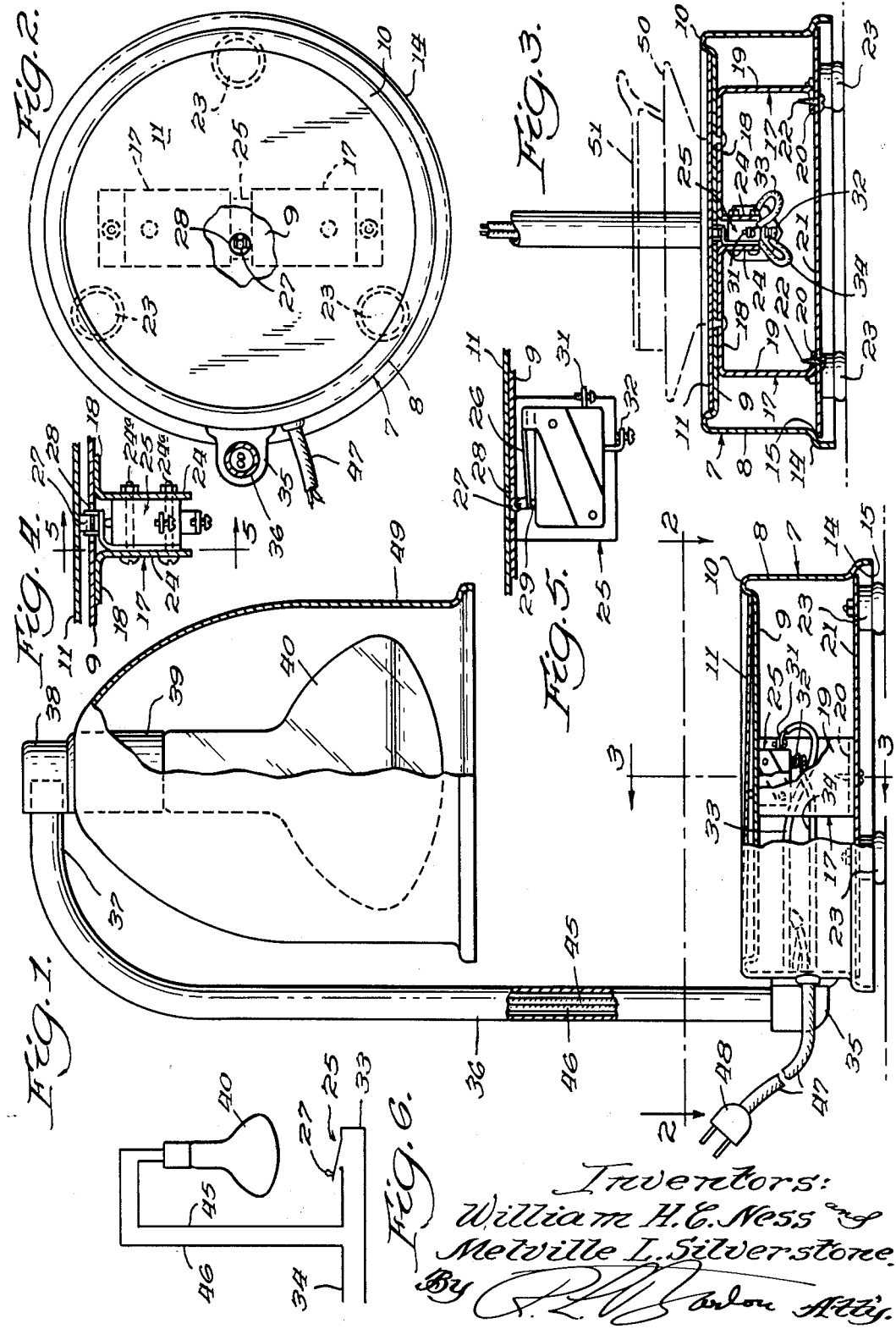
March 13, 1956 — W. H. C. NESS ET AL — 2,738,410
ELECTRIC WARMER FOR COOKED EDIBLE
Filed March 12, 1953
Inventors:
William H. C. Ness &
Melville L. Silverstone

2,738,410

ELECTRIC WARMER FOR COOKED EDIBLE

William H. C. Ness, Los Angeles, and Melville L. Silverstone, Van Nuys, Calif., assignors to National Cornice Works, Los Angeles, Calif.

Application March 12, 1953, Serial No. 341,942

1 Claim. (Cl. 219—34)

This invention relates to an electric warming device for cooked edibles, being particularly well adapted to warm bakery products preparatory to serving them.

It is well known that baked goods taste best when served warm. Accordingly it is now a common practice to warm them before serving, but to do so in an unsatisfactory manner, either by placing them on the grill or in the oven. The grill overheats and often scorches the bottom of rolls and the like, and the oven tends to overbake or, at least, dry them out. Both these methods are of a make-shift character, being too slow and also otherwise unsatisfactory.

Accordingly it is an important object of the present invention to provide a device to warm rolls, pies and other baked foods in a more rapid and more satisfactory manner.

A more specific object is to provide an improved means for directing electrically generated heat upon the edible to be warmed.

Another specific object is to provide an improved combination dish support and electric switch operating floating plate to automatically turn the heating electric current on at the commencement of a warming operation and to turn it off at the completing of said operation, when the dish containing the food is removed.

Another object is to provide a new and advantageous mode of assembly wherein is included an electric switch mounting and operating means which is so positioned as to be more dependably and positively operable by the weight of a food carrying dish when placed upon the device within the range of the rays of the heating lamp.

Other objects, advantages and features of invention will hereinafter appear.

Referring to the acompanying drawing, which illustrates a preferred, reduced to practice embodiment of the invention, Fig. 1 is a side view of the complete device, partly in elevation and partly in section.

Fig. 2 is a horizontal section on line 2—2 of Fig. 1, a portion of the switch actuating plate being broken away to disclose the switch structure therebelow.

Fig. 3 is a vertical section through the basal portion of the device, on line 3—3 of Fig. 1. This view shows the device loaded with food to be warmed, the weight of the food maintaining the microswitch in its closed position. The dish and food thereon are shown in phantom lines.

Fig. 4 is an enlarged, fragmentary section looking from right to left in relation to Fig. 5, but with the switch open.

Fig. 5 is a vertical section on line 5—5 of Fig. 4, showing the microswitch in the closed position.

Fig. 6 is a wiring diagram.

Referring in detail to the drawing, and more particularly to Figs. 1, 2 and 3, the basal structure 7 comprises a circular sheet metal shell 8 shaped in general as an inverted cup, the upwardly directed bottom of which forms a top wall 9 which is bordered by an upstanding ledge 10 to keep in place a switch operating top member shown as a floating plate or disk 11 positioned in an overlying relation to said top wall 9.

Said cup shaped shell 8 has an outwardly flared skirt portion 14 which provides an internal, downwardly facing annular shoulder 15, the utility of which will presently appear.

Within the space enclosed by said cup shaped member 8 is mounted a pair of twin, angular brackets 17 each of which is of an inverted L shape with its horizontal limb 18 underlying and riveted to the aforesaid wall 9 and with its vertical limb 19 terminating in a right-angularly directed flange 20 which overlies a circular floor plate 21 and is secured thereto by screws 22, so that said floor plate (which fits within the aforesaid circular flange 14) is held in place with its peripheral portion abutting the aforesaid annular shoulder 15. Said floor plate has bolted to it a plurality of foot members 23.

The outer end of each aforesaid horizontal bracket arm 18 carries a downwardly directed flange 24, these flanges being spaced apart and having fitted between and bolted to them, by nut carrying screw bolts 24a, a conventional microswitch frame 25. This switch frame carries a resilient, movable switch arm 26 upon the offset free end portion of which is mounted on anti-friction roller 27, there being an aperture 28 in the aforesaid top wall 9 of the basal structure which allows said arm 26 normally to spring up slightly above the position of these parts as shown in Fig. 5 (see also Fig. 4), so that the aforesaid switch operating plate, when weighted down as hereinafter explained, will press upon said roller and close the switch by depressing said arm until its free end portion engages the stationary contact 29. The microswitch structure includes terminals 31 and 32 to which, respectively, are connected the line wires 33 and 34. This microswitch structure may be the microswitch listed by the Micro Switch Division of Minneapolis Honeywell Regulator Co., of Freeport, Ill., in their Micro Switch Catalog No. V3-1, as a 10 ampere, 125 volt switch or any desired equivalent microswitch may be substituted.

One side portion of the aforesaid basal structure 7 carries a bracket 35 provided with an upwardly facing threaded socket into which is screwed the lower end portion of a tubular, lamp supporting standard 36 having a laterally directed upper end portion 37 upon which is screwed the cap portion 38 of a hollow, lamp holding body 39, said cap portion having in its side a screwthreaded socket. Said body 39 carries a lamp 40 adapted to generate infra red rays and direct them into the space superjacent to the aforesaid switch operating plate 11.

For said lamp 40 may be used the infra red reflector heat lamp, 250 watts, 115-125 volts, listed in Catalog No. R40/4 of the General Electric Co., Bridgeport, Conn., and for the aforesaid lamp holding body 39 may be used the lamp holder listed in Lamp Holder Catalog No. 8877 of Arrow Electric Div. of Arrow-Hart & Hegeman Electric Co., Hartford 1, Conn., and the aforesaid cap portion 38 may be the ⅜″ angle cap also listed by the latter company in their said catalog No. 8877.

Current for energizing said lamp 40 is conveyed thereto through branch wires 45 and 46, the former wire being connected to the aforesaid terminal 29 and the latter wire being a continuation of the line wire 34. Said line wires are contained in the cord 47, which carries a plug-in member 48. A reflector 49 with an ovoidal upper end portion, is carried by the lamp body 39 and efficiently directs downwardly the rays of the lamp.

Fig. 3 illustrates the use of the device as a means for warming a baked article, this view showing in phantom lines a dish 50, which may be a serving plate, containing a piece of pie 51, said dish resting on the plate 11, and said plate 11, in turn, engaging the roller 27 carried by the resilient switch arm 26. As a result, the weight of the loaded plate depresses said switch arm, causing the free end portion of the latter to engage the terminal 29 and close the circuit through the lamp 40, energizing of which causes powerful infra red rays to be directed down upon and quickly to warm the edible 51. The heat from the lamp will heat a roll or pie from the inside out in approximately one and one-half minutes. As soon as said edible has been warmed to the desired extent the attendant will remove the dish 50 from the plate 11, whereupon the resilient switch arm 26 will spring up to its normal position, thus opening the circuit and de-energizing the lamp.

It will be observed that, in the operation of the device, when a food carrying dish is deposited upon the circular floating disk 11 it will positively depress the resilient switch arm located at the center of said disk 11, even though the dish may be eccentrically positioned in relation to the disk.

The ledge 10 around the top of the basal structure 7 keeps in place the floating, switch operating plate 11, and the presence of the anti-friction roller 27 makes more positive the operation of the switch.

The device may be given a satin-finish aluminum plating throughout, thus making it an ornamental adjunct for a restaurant's backbar or counter.

It should be understood that the present disclosure is for the purpose of illustration only and that this invention includes all modifications and equivalents which fall within the scope of the subject matter claimed.

We claim:

In an electric food warming device of the kind described, in combination, a basal structure, a heating lamp supported thereabove in a vertically spaced relation thereto, said basal structure including a substantially horizontal top wall having an aperture through its central part, a detached, floating plate overlying said top wall, means carried by said basal structure to hold said plate against lateral displacement, an electric switch including a resilient switch arm, a roller mounted on the end of said arm, said roller projecting through said aperture to engage said plate from below, said arm being tensed normally to maintain the central portion of said plate slightly spaced above said basal structure, and an electric circuit including said lamp and switch, the weight of a food carrying dish deposited upon said plate adapted to depress said arm and close said circuit, causing said lamp to warm the food in said dish.

References Cited in the file of this patent

UNITED STATES PATENTS

| | | |
|---|---|---|
| 1,157,731 | Sprenger | Oct. 26, 1915 |
| 1,552,335 | Mottlau | Sept. 1, 1925 |
| 1,637,155 | Marsden | July 26, 1927 |
| 1,719,710 | Matthews | July 2, 1929 |
| 1,959,935 | Shroyer | May 22, 1934 |
| 2,198,645 | Wolcott | Apr. 30, 1940 |
| 2,660,658 | Wagner | Nov. 24, 1953 |